Feb. 10, 1925.
C. F. JENKINS
DISTANT MOTOR CONTROL
Filed April 21, 1923
1,525,553
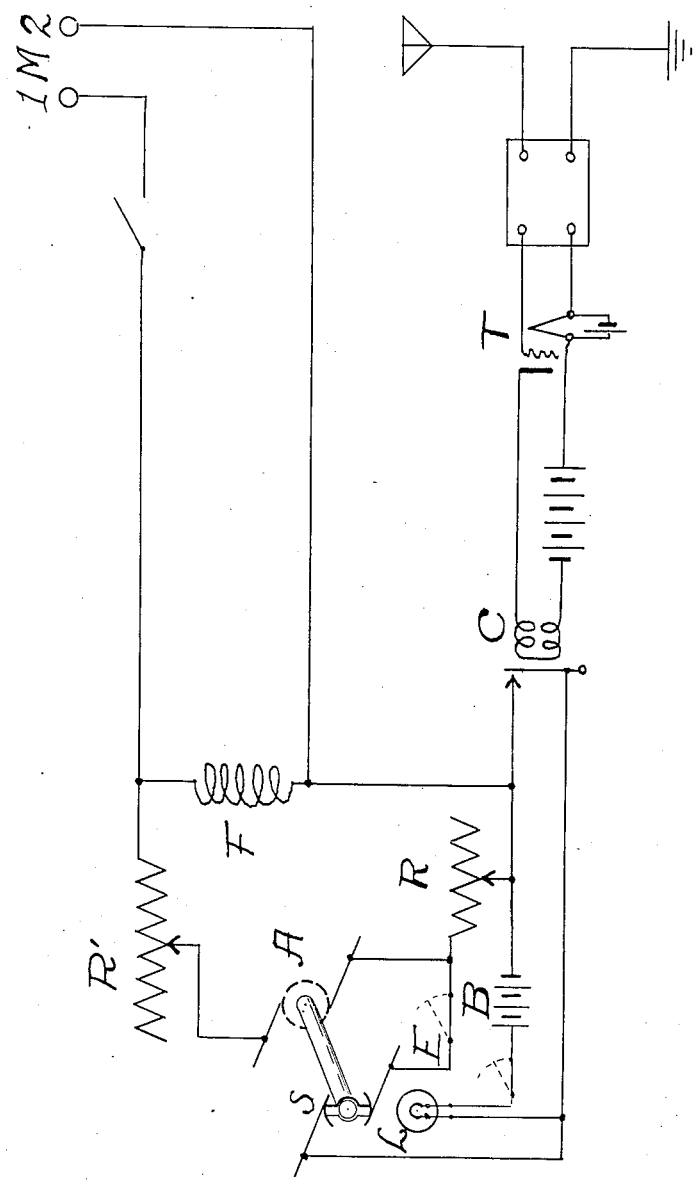
WITNESS:
Sybil Almand.
Inventor
C. Francis Jenkins Patented Feb. 10, 1925.

1,525,553

UNITED STATES PATENT OFFICE.

CHARLES FRANCIS JENKINS, OF WASHINGTON, DISTRICT OF COLUMBIA, ASSIGNOR TO RADIO PICTURES CORPORATION, OF WASHINGTON, DISTRICT OF COLUMBIA, A CORPORATION.

DISTANT MOTOR CONTROL.

Application filed April 21, 1923. Serial No. 633,652.

*To all whom it may concern:*

Be it known that I, CHARLES FRANCIS JENKINS, citizen of the United States, residing at Washington, District of Columbia, have invented certain new and useful Improvements in a Distant Motor Control, of which the following is a specification.

This invention relates to apparatus used in radio vision, and has for its principal object to provide means for maintaining in synchronism distantly separate stations,— means hereinafter disclosed, and particularly pointed out in the claims.

In the accompanying drawings, F is the field and A the armature of a motor, the rotation of which it is desired to control automatically. The armature shaft has at one end the usual commutator, and at the opposite end a two-segment commutator S. The speed of rotation of the motor is adjusted by means of rheostat R and R'. The current which rotates the motor comes from the mains M, and, traced, may be assumed to flow through the circuit $M^2$ to the field terminal, where the circuit divides, the current flowing through the field back to the main $1^M$; while current similarly flows through the armature A from the field terminal down to the adjustable connection of the rheostat R, and from the rheostat up through the commutator A of the armature, and the rheostat R' back to the terminal $1^M$.

Signals coming in through the radio apparatus and the tube T energizes the coils C of the relay. The action of the relay intermittently closes the circuit through the battery B and the lamp L (the switch E being open). The lamp is so located that it illuminates the commutator S intermittently, a stroboscopic method of examination, the subject of application Serial No. 619,995. If the intermittent incoming signals which light the lamp are in phase with the rotation of the motor, the commutator S seems to stand still. If, however, it seems to slowly rotate either to the right or to the left, the motor rheostat can be adjusted until the apparent rotation ceases. The adjustment which is desired, however, is such that the rotation indicates that the motor is slightly slower in phase than the incoming radio signals.

By closing the switch E, and assuming the motor to have lagged until the commutator S short circuits the brushes at the same time the armature contact closes, the rheostat R is cut out, and, therefore, the motor speeds up. The current through the armature circuit would then flow from the main $M^2$ to the field terminal, thence to the relay, thence along the lower connection up to the commutator S, thence through the switch E, and upward through the main commutator A, the rheostat R', to the terminal $1^M$.

The effect of the closing of the relay, and thus cutting out the rheostat R, is to speed up the motor until presently the relay closes after the brushes make contact at commutator S, the motor then getting its current through the rheostat R.

It will thus be seen that the current through the armature flows either through the rheostat R or through the relay contact cutting out the rheostat; the motor being speeded up when the rheostat R is cut out until it is brought into phase with the incoming signals. In actual practice it has been found that the current divides itself very delicately between the rheostat and the relay circuits, and that the motor is held, with a high degree of precision, in phase with the incoming signals.

It is obvious that the incoming signals should bear a definite phase relation with the motor at the sending station, though this is no part of the present application.

What I claim is—

1. The combination of a rotary electric motor, a resistance in series with said motor, a contact-making device on the shaft of said motor, a vibrating contact-making device, means for keeping same in constant vibration by electric signals sent from a distant station, and means for changing the motor resistance when the contact on the motor and the contact on the vibrating device occur simultaneously.

2. The combination of a rotary electric motor, a resistance in series with said motor, a contact-making device on the shaft of said motor, a vibrating contact-making device, means for keeping same in constant vibration by electric signals sent from a distant station, and means for changing the motor resistance when the contact on the motor and the contact on the vibrating device occur simultaneously.

In testimony whereof I have affixed my signature.

CHARLES FRANCIS JENKINS.